Nov. 15, 1966 C. M. CORNWELL 3,286,191
AFC WITH OFFSET FREQUENCY DIVIDER
Filed April 8, 1965
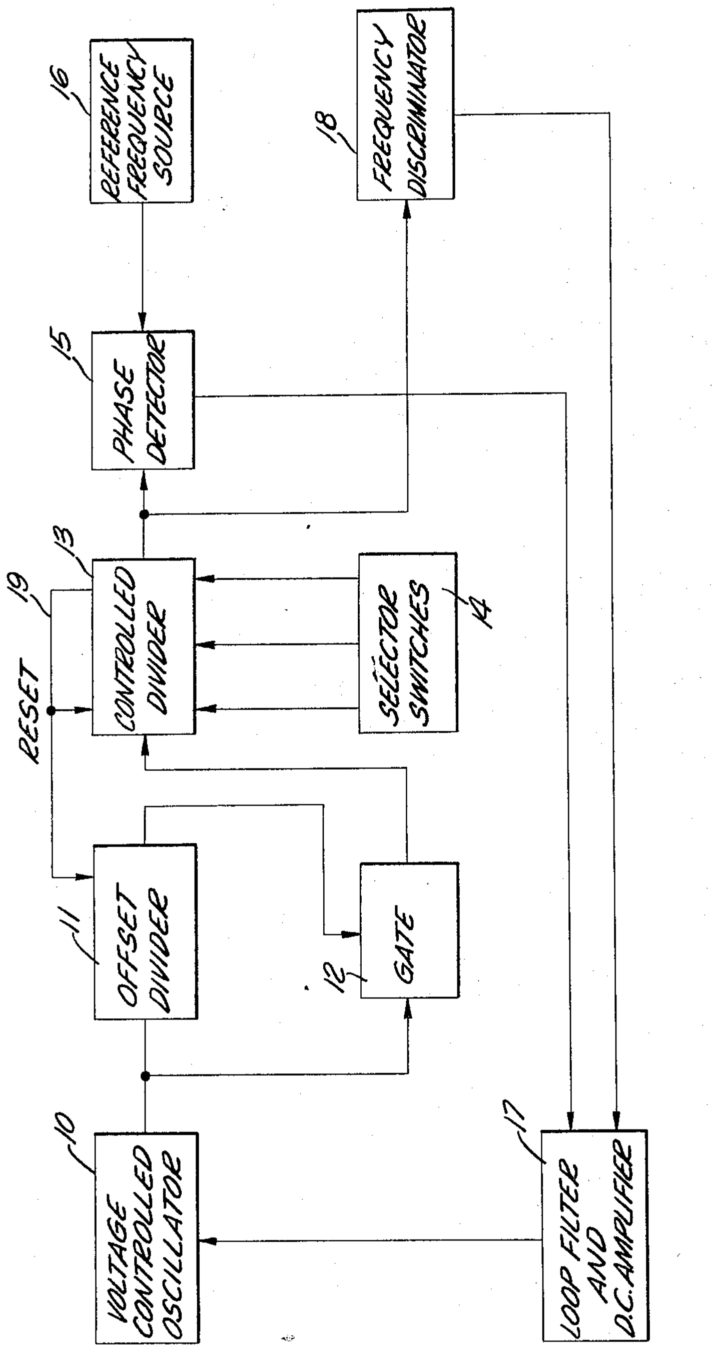
INVENTOR.
CHARLES M. CORNWELL
BY Lyon & Lyon
ATTORNEYS Nov. 15, 1966 C. M. CORNWELL 3,286,191
AFC WITH OFFSET FREQUENCY DIVIDER
Filed April 8, 1965
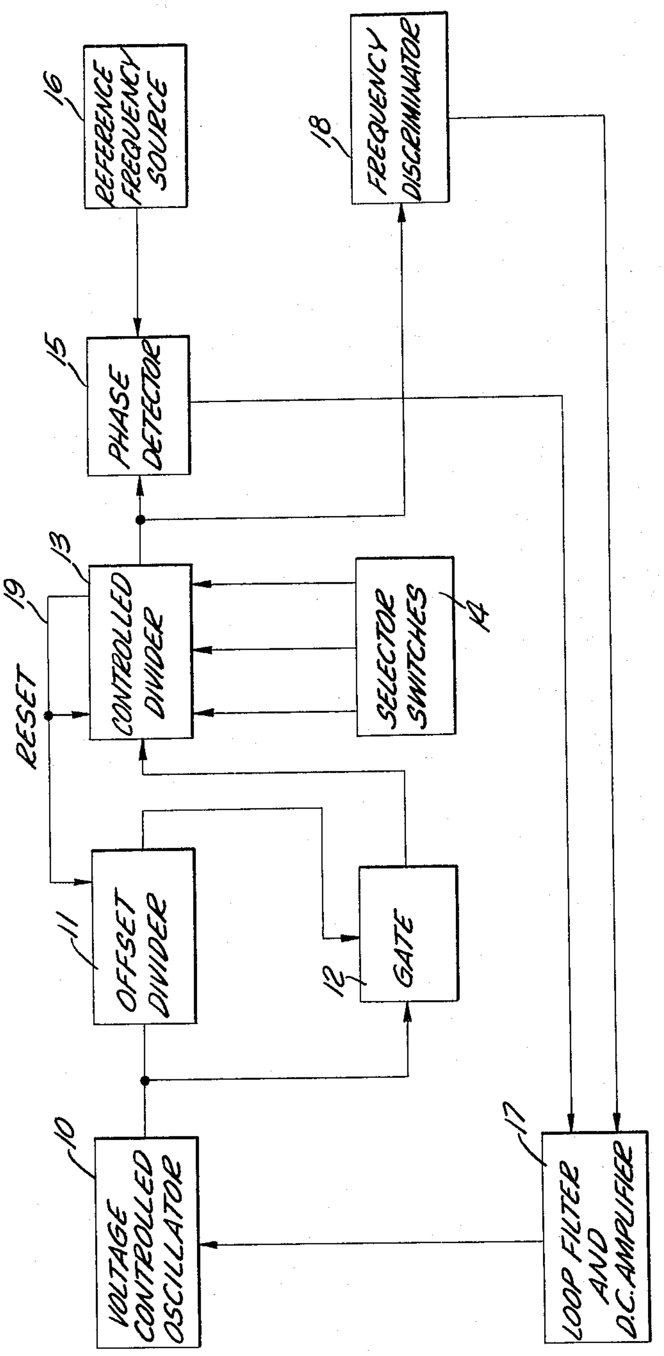
INVENTOR.
CHARLES M. CORNWELL
BY Lyon & Lyon
ATTORNEYS 3,286,191

AFC WITH OFFSET FREQUENCY DIVIDER

Charles M. Cornwell, El Monte, Calif., assignor to Hoffman Electronics Corporation, El Monte, Calif., a corporation of California Filed Apr. 8, 1965, Ser. No. 446,556
7 Claims. (Cl. 331—11)

This invention relates to a frequency synthesizer system and more particularly relates to such a system wherein a predetermined frequency offset is provided.

Digital frequency synthesizers are used in many applications where it is desired to make available a plurality of different frequencies within the output frequency range of an oscillator. In a conventional digital frequency synthesizer, a voltage controlled oscillator is connected to a control divider, commonly a digital counter, which is provided with three setting switches, for example, one for 10 kc. increments, one for 1 kc. increments, and one for .1 kc. or hundred cycle increments. The setting switches are ordinarily of the binary coded decimal type and are arranged to read out frequency directly. The control knobs set the synthesizer to the desired frequency by setting the divisor of the controlled divider.

For example, for a frequency of 61.9 kc., a divisor of 619 is set into the divider. A reference frequency of 100 cycles per second is provided and is fed to one input of a phase detector. The other input of the phase detector is connected to the output of the controlled divider. When the output of the voltage controlled oscillator is at 61.9 kc., the divider output is 100 cycles per second and the output of the phase detector is zero. When the output of the voltage controlled oscillator varies from the desired 61.9 kc., the resulting error signal produced by the phase detector is fed back to the voltage controlled oscillator to bring its output back to the desired frequency.

While such synthesizers are very satisfactory for many applications, it is often desired to provide a frequency offset, that is, to cause the output of the voltage controlled oscillator to differ by a predetermined amount from the frequency fed into the controlled divider. For example, if it is desired to use the synthesizer as a local oscillator in a receiver, it is often desirable for the synthesizer output frequency to run above the tuned frequency of the receiver by an amount equal to the intermediate frequency of the receiver. In such cases, however, it is still desirable that the panel indicator of the synthesizer read out the receiver tuned frequency. Thus, in the case where the receiver covers the frequency range of 50 kc. to 99.9 kc. in 100 c.p.s. increments and has an 8 kc. intermediate frequency, the required frequency range of the synthesizer would be 58 kc. to 107.9 kc. It is preferred, however, that the indicated frequency of the synthesizer be that of the receiver, i.e., 50–99.9 kc.

It is therefore an object of the present invention to provide a frequency synthesizer system in which the synthesizer can be provided with a fixed frequency offset.

It is also an object of the present invention to provide such a system in which an auxiliary divider or counter is provided for establishing the frequency offset.

It is another object of the present invention to provide such a system in which the output of the voltage controlled oscillator is not transferred to the controlled divider until the predetermined frequency offset has been counted by the auxiliary counter.

These and other objects and advantages of the present invention will become more apparent upon reference to the accompanying description and drawing, the single figure of which is a schematic block diagram of the system of the present invention.

Briefly, the system of the present invention provides an auxiliary or offset counter or divider which receives the output of the voltage controlled oscillator. The output of the oscillator is also passed to a gate, the gating signal of which is produced by the offset divider. The offset divider is set to count the predetermined offset and then produce an output signal which opens the gate. The output of the voltage controlled oscillator is then passed through the gate to the controlled divider which then begins to count in the fashion of the conventional system. As in the conventional system, the output of the controlled divider is compared with a reference by a phase detector, the output of which is used to control the output of the voltage controlled oscillator.

Turning now to the drawing, a voltage controlled oscillator 10 has its output connected to an offset divider 11 which may, for example, be a conventional binary counter. The desired frequency offset is set in this divider which may, for example, be arranged to count in 0.1 kc. increments. If a frequency offset of 8.0 kc. was desired, the offset divider 11 would thus be set to count to 80 before producing an output.

The output of the voltage controlled oscillator 10 is also fed to a gate 12 which receives its gating signal from the output of the offset divider 11. The output of the gate 12 is connected to a controlled divider 13 which is arranged to count in the same increment as the offset divider 11, here in increments of 0.1 kc. The desired divisor of the divider 13 is set by selector switches 14 in the conventional manner. The output of the controlled divider 13 is connected to one input of a phase detector 15, the other input of which is connected to a reference frequency source 16. The reference frequency source produces an output at the same frequency as the smallest increment counted by the dividers 11 and 13, here 0.1 kc. or 100 c.p.s. The output of the phase detector 15 is fed to a loop filter and D.C. amplifier 17, the output of which controls the oscillator 10. The output of the controlled divider 13 is also fed to a frequency discriminator 18. The output of the frequency discriminator 18 is also fed to the loop filter and D.C. amplifier 17. A reset line 19 is provided for resetting the controlled divider 13 and offset divider 11 when the controlled divider has accepted its preset number of pulses.

In describing the operation of the system it will be assumed for convenience that it is desired that the controlled divider be set to 61.9 but that the voltage controlled oscillator be tuned to actually produce an output of 69.9 kc., that is, a frequency offset of 8 kc. is to be provided. The selector switches 14 are set to 61.9 to establish the divisor in the controlled divider 13. Since the minimum increment to be counted is 0.1 kc., the offset divider 11 is set to count 80 pulses.

When the system operation is initiated, the output of the oscillator 10 is fed to the offset divider 11 and is blocked from the controlled divider 13 by the closed gate 12. After the offset divider 11 has counted 80 pulses, it produces an output signal which opens the gate 12, permitting the output of the oscillator 10 to pass through to controlled divider 13. This divider divides the output by a factor of 619 so that if the oscillator is producing an output frequency at the desired 69.9 kc., the output of the controlled oscillator should be 100 cycles. This is compared to the reference frequency of 100 cycles in the phase detector 15. The output of the phase detector is passed through the loop filter and D.C. amplifier 17 to the voltage controlled oscillator 10 where it acts to reduce the output frequency if it is above the desired 69.9 kc. or increase it if it is below the desired value. Stated mathematically, the output frequency F of the oscillator 10 is equal to $n_1$ times $F_r$ plus K, where $n_1$ is the divisor of the divider 13, and $F_r$ is the reference frequency provided by the source 16. K is the frequency offset provided as a result of the offset divider 11, and is equal to the divisor of the divider 11 times the reference frequency $F_r$. Therefore, the output frequency F is equal to the reference frequency $F_r$ times the sum of the divisors $n_1$ and $n_2$.

After the controlled divider 13 has accepted the preset number of pulses, it generates a reset pulse along the line 19 which resets both the offset divider 11 and the controlled divider 13. The cycle is then repeated. The frequency discriminator 18 is provided to bring the error signal within the capture range of the phase detector as is often done in the conventional digital synthesizer system. As a result of providing the offset divider 11 and gate 12, the controlled divider 13 can be set by the selector switches 14 to the tuned frequency of a receiver while the output frequency of the system actually runs above the tuned frequency of the receiver by an amount equal to the receiver intermediate frequency.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A frequency synthesizer system of the type having a voltage controlled oscillator, a controlled divider and a phase detector for comparing the output of the controlled divider with a reference and producing an error voltage for controlling the oscillator, the improvement comprising means causing said oscillator to generate a frequency which is offset from the frequency selected by said controlled divider including an additional divider responsive to said oscillator for establishing said frequency offset, a gate connected with and controlled by said additional divider, and means coupling said gate between said oscillator and said controlled divider for passing the output of said oscillator to said controlled divider after said gate is controlled by said additional divider.

2. A frequency synthesizer system comprising a voltage controlled oscillator, a first frequency divider coupled to the output of said oscillator, a second frequency divider, a gate having an input coupled to the output of said oscillator and an output coupled to said second divider, means coupling the gating input of said gate to the output of said first divider whereby said gate is opened when said first divider produces an output signal allowing the output of said oscillator to pass through said gate to said second divider causing said second divider to divide the output of said oscillator and produce an output frequency, means for comparing the output frequency of said second divider with a reference frequency and producing an error signal, and means for applying said error signal to said oscillator to control the output thereof.

3. A frequency synthesizer system comprising a voltage controlled oscillator, a first frequency divider coupled to the output of said oscillator, said divider producing an output control signal after the occurrence of a predetermined number of input pulses thereto, a second frequency divider, means for selecting the divisor of said second divider, a gate having an input coupled to the output of said oscillator and an output coupled to said second divider, means coupling the gating input of said gate to the output of said first divider whereby said gate is opened by the control signal from said first divider and the output of said oscillator is passed through said gate to said second divider allowing said second divider to divide the output of said oscillator, a reference frequency source, a phase detector having inputs coupled to said second divider and said reference source for comparing the outputs thereof and producing an error voltage, and means for applying said error voltage to said oscillator to control the output thereof.

4. The system of claim 3 wherein means are provided for simultaneously resetting said first and second dividers when said second divider has received the number of pulses established by said divisor setting means.

5. The system of claim 3 wherein the output of said second divider is coupled to a frequency discriminator having its output coupled to said applying means.

6. A frequency synthesizer including a voltage controlled oscillator for producing a frequency offset output, a controlled divider and a phase detector for comparing the output of the controlled divider with a reference frequency and producing an error signal for controlling the oscillator, the improvement comprising means causing said oscillator to generate a frequency which is offset from the frequency selected by said controlled divider including an additional divider responsive to said oscillator for establishing said frequency offset, a gate coupled with and controlled by said additional divider, and means coupling said gate between said oscillator and said controlled divider for passing the output of said oscillator to said controlled divider after said gate is controlled by said additional divider thereby causing said controlled divider to divide the output of said oscillator, the output frequency of said oscillator being the sum of the divisors of said controlled divider and said additional divider times said reference frequency.

7. A frequency synthesizer system including a voltage controlled oscillator providing an output frequency F, where F is equal to $n_1$ times $F_r$ plus K; frequency dividing means coupled with the output of said oscillator; and phase detector means coupled with the output of said frequency dividing means and responsive to a reference frequency source providing a reference frequency $F_r$ for producing an error voltage for controlling said oscillator; said frequency dividing means including offset divider means, control divider means and gate means, said gate means being coupled between the output of said oscillator and said control divider means, said offset divider means being coupled with the output of said oscillator means for operating said gate means and allowing signals to pass from said oscillator to said control divider means, the divisor of said control divider means being equal to $n_1$, the divisor of said offset divider means being equal to $n_2$, and K being equal to $n_2$ times $F_r$.

References Cited by the Examiner

UNITED STATES PATENTS

| | | | |
|---|---|---|---|
| 2,521,789 | 9/1950 | Grosdoff | 331—18 |
| 3,217,267 | 11/1965 | Loposer | 331—18 |

NATHAN KAUFMAN, *Primary Examiner.*

J. KOMINSKI, *Assistant Examiner.*